Nov. 18, 1952     H. A. MULVANY     2,618,562
PRESERVATION OF EGGS
Filed March 29, 1950
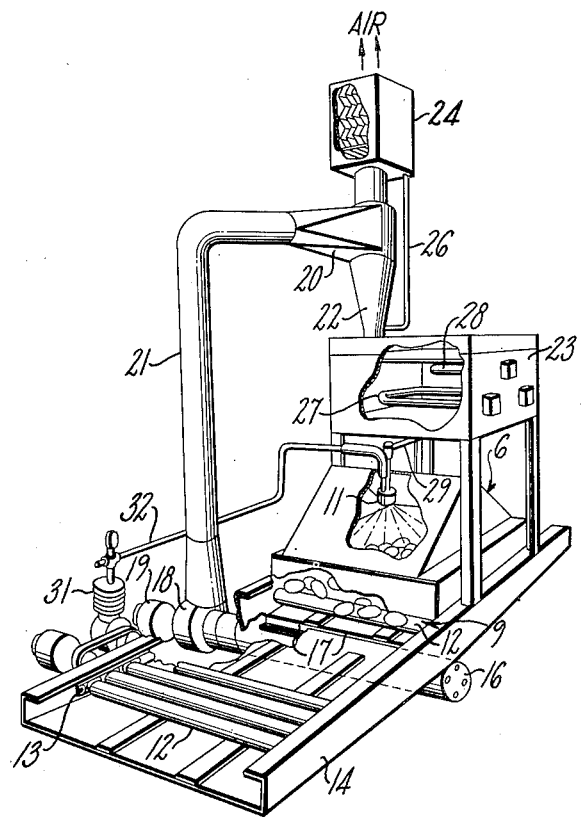
INVENTOR.
Harry A. Mulvany
BY
ATTORNEY Patented Nov. 18, 1952

2,618,562

UNITED STATES PATENT OFFICE 2,618,562

PRESERVATION OF EGGS

Harry A. Mulvany, Berkeley, Calif.

Application March 29, 1950, Serial No. 152,626

3 Claims. (Cl. 99—170)

This invention relates to processes for preserving eggs wherein a suitable oil is applied as a coating to the shells of the eggs.

The general method of preserving eggs by the application to the egg shells of a suitable oil has been well understood in the art and widely practiced. The oil usually employed is an odorless, colorless and tasteless oil; such as that known as petroleum white oil. The original method called for the application to the egg shells, as by dipping or spraying, of an oil at a temperature of the order of 230° F. to obtain proper sterilizing of the oil. This method has the disadvantage of heating the eggs whereby these are undesirably altered; in addition, application of the hot oil to the cold eggs results in undue breakage of the eggs.

An alternate process has been proposed and used wherein oil has cooled to approximately 32° F. or lower before application. This latter process, while avoiding breakage of eggs and deterioration due to heat, left unsolved the problem of producing eggs with sterilized shell coatings. Oil at or about room temperature soon becomes contaminated with bacteria and the bacterium count rises thereafter, with consequent contamination of the eggs. A great many spoiled storage eggs have resulted from this latter process. The problem thus presented has been to avoid the application of heat to the egg shells and at the same time avoid the infecting of the eggs with contaminated oil.

In accordance with the present invention and as a principal object thereof, I provide a process for applying an oil coating to egg shells for preservation of the eggs wherein the oil is heated for a time and to a temperature whereat the oil is rendered sterile prior to application and, concurrently with application, is cooled to a temperature whereat it can be applied to the egg shells without any danger of any undesirable effect upon the eggs. In addition, the reuse of unused oil is made possible for this is collected, sterilized and reused whereby the oil quantity otherwise employed is reduced by one-half.

Another object of the invention is to provide a process of the character described which is adapted for relatively low cost and continuous large production of processed eggs.

The invention possesses other objects and features of advantage, some of which, with the foregoing, will be set forth in the following description of the preferred form of the invention which is illustrated in the drawing accompanying and forming part of the specification. It is to be understood, however, that variations in the process as described hereunder may be adopted within the scope of the invention as set forth in the claims.

Referring to the drawing accompanying and forming a part hereof, the single figure is a perspective view of an apparatus, shown partly in diagrammatic form, for carrying out the process of the present invention.

I have found that by atomizing sterile hot oil so as to break up the oil into finely divided particles, a sufficient reduction in temperature in the oil results so as to permit a direct application of the oil spray to the eggs to be treated without incurring the deleterious heating effects which otherwise attends application of hot oil to eggs.

The oil is heated to a temperature sufficient to ensure sterile oil and heating a temperature of from 212° F. to 400° F. usually suffices to destroy all organisms within the oil; the temperature utilized should be sufficient to ensure a sterile oil. The enormous surface contact obtained between the oil particles and the atmosphere when the oil is sprayed causes an almost instantaneous cooling of the oil to a temperature closely approximately that of the adjacent atmosphere, e. g. about 35° to 70° F., making it possible for a person to place his hand with comfort in the spray within 8" of the atomizer; this is so notwithstanding the fact that the oil enters the atomizing nozzle at 212°–400° F. Eggs passed through such a spray are processed with excellent results. The oil can be atomized with sterile air or other gaseous medium to assist in the spray application, thereby facilitating cooling of the oil immediately prior to egg application.

The apparatus for carrying out the continuous processing of eggs by the present invention is illustrated in the drawing. The apparatus includes a casing or hood 6 providing a processing chamber through which the eggs are passed by a conventional continuous roller conveyor 9 extending through the chamber in underlying relation to a spray head 11. The conveyor illustrated includes a plurality of rollers 12 carried in suitable chains 13 which advance in guide frame 14. The eggs are supported between the rollers and rotated during the course of movement so as to present all sides to the spray emanating from head 11. The conveyor drive is omitted for convenience. Eggs are appropriately loaded onto the conveyor at one side of the casing 6 for transportation through the chamber by the conveyor and removal therefrom at the opposite side of the chamber.

Excess or run-off oil and air-oil mixture is drawn into a suction pipe 16 which extends across the conveyor 9 slightly past the casing 6 to pick up oil and oil-air mist as the eggs issue from the casing. The pipe 16 has an opening 17 to admit the oil and oil-air, a blower 18 driven by motor 19 forcing the mixture over into a cyclone separator 20 through pipe 21. The oil drains back from the cyclone through pipe 22 into heater 23 while the air escapes through baffle-separator 24, oil draining from the separator through pipe 26 into the heater 23. The oil in the chamber 23 is heated by a heating element 27 to a desired elevated temperature and the operation of this element may be controlled by a thermostat 28 for maintaining substantial constancy of temperature. Oil is shown as withdrawn from the chamber 23 by pipe 29 to spray head 11 while air is supplied by compressor 31 having a discharge pipe connection 32 to the spray head 11. The head 11 is preferably constructed, as is well understood in the art, to provide an atomizing of the oil upon introduction of oil and air to the spray head 11; for example, head 11 can be of a construction similar to that utilized in the spraying of paint and the like.

In operation, the oil in the chamber 23, being heated for a time and to a temperature whereat the oil is sterile, conveyor 9 is caused to move continuously through the chamber 6, air and oil being supplied to the spray head 11, which is placed about eighteen inches above the eggs. The quantity of air required is dependent on the oil quantity atomized and this in turn is dependent on the eggs processed. Generally from one-half to one gallon of oil per hour is required for twenty cases of eggs (30 dozen to a case). Any excess of oil is not wasted, running off or being otherwise collected by the air-suction applied. As I have stated, air need not be used for atomization, but in this case the oil should be ejected from the spray head under a pressure adequate to its atomization. I have used pressures of the order of 1,000 pounds per square inch with success, depending on the atomizing nozzle.

Even though the oil is at an oil sterilizing temperature, cooling of the oil upon atomization and the heat transfer past the shell into the egg is so poor that only a negligible temperature rise occurs in the egg. For example, in one commercial operation, eggs having a temperature of 54° F. were passed through the machine at the rate of twenty cases per hour (7200 eggs per hour). Oil at 300° F. was sprayed on the eggs, approximately twenty seconds being required for traverse of the eggs past the oil sprays. An egg, held stationary directly under the spray for twenty seconds, increased in temperature only 1½° F. when permitted to come to temperature equilibrium. This measure of temperature rise is not truly indicative of the actual temperature increase, being much more severe and less actual increase taking place in practice. The oil spray striking the eggs is at approximately a normal atmospheric temperature, e. g. from 40° F. to 120° F., depending on the actual atmospheric temperature and the oil temperature.

I claim:

1. The method of applying an oil coating to shell eggs, comprising heating oil to a sterilizing temperature, atomizing the hot sterile oil and applying the oil while atomized to shell eggs, said atomizing serving to suddenly cool the oil whereby the oil temperature is not over about 120° F. upon contacting the shell eggs.

2. The method of applying an oil coating to eggs comprising heating oil to a temperature of from 212° F. to 400° F., atomizing said oil and applying the oil white atomized to shell eggs, said atomizing serving to cool the oil to a temperature of from 35° F. to 120° F. before said oil touches the surface of the shell eggs.

3. The method of claim 2 wherein the atomizing serves to cool the oil to from 35° F. to 70° F.

HARRY A. MULVANY.

REFERENCES CITED

The following references are of record in the file of this patent:

UNITED STATES PATENTS

| Number | Name | Date |
|---|---|---|
| 604,621 | Kunkel | May 24, 1898 |
| 649,652 | Wilson et al. | May 15, 1900 |
| 2,014,646 | Christian et al. | Sept. 17, 1935 |
| 2,184,063 | Meyer et al. | Dec. 19, 1939 |
| 2,408,648 | Inman | Oct. 1, 1946 |
| 2,502,616 | Cranmer et al. | Apr. 4, 1950 |

OTHER REFERENCES

"U. S. Egg & Poultry Magazine," April 1948, page 10, article entitled "The Secret of Oiling Eggs Successfully."